(12) United States Patent
Korte et al.

(10) Patent No.: US 7,845,108 B2
(45) Date of Patent: Dec. 7, 2010

(54) STORAGE PLATFORM FOR STORING AND WATERING PLANTS, AND WATERING DEVICE

(75) Inventors: Hermann Korte, Surwold (DE); Rudolf Schomaker, Sögel (DE); Reinhold Trinczek, Büchen (DE)

(73) Assignee: Dipl.-Ing. Hermann Korte, Surwold (DE)

( * ) Notice: Subject to any disclaimer, the term of this patent is extended or adjusted under 35 U.S.C. 154(b) by 1034 days.

(21) Appl. No.: 11/347,452

(22) Filed: Feb. 3, 2006

(65) Prior Publication Data

US 2006/0218858 A1    Oct. 5, 2006

(30) Foreign Application Priority Data

Mar. 31, 2005    (DE)    ............... 20 2005 005 087 U

(51) Int. Cl.
*A47G 7/00*    (2006.01)
(52) U.S. Cl. .......................................................... 47/39
(58) Field of Classification Search .................. 108/107, 108/110; 211/187; 248/243; 280/79.3
See application file for complete search history.

(56) References Cited

U.S. PATENT DOCUMENTS

| | | | |
|---|---|---|---|
| 929,723 A * | 8/1909 | Stearns | ......... 108/110 |
| 949,288 A * | 2/1910 | Stearns | ......... 108/110 |
| 2,654,346 A | 10/1953 | Goff | |
| 3,086,364 A | 4/1963 | Chapin | |
| 3,108,400 A | 10/1963 | Wolfe, Jr. | |
| 3,455,054 A | 7/1969 | Tibbals, Jr. | |
| 3,482,785 A | 12/1969 | Chapin et al. | |
| 3,606,157 A | 9/1971 | Chapin | |
| 3,628,805 A | 12/1971 | Archer et al. | |
| 3,664,063 A | 5/1972 | Ware | |
| 3,772,827 A * | 11/1973 | Ware | ............ 47/39 |
| 3,797,842 A | 3/1974 | Swick, Jr. et al. | |
| 3,822,672 A | 7/1974 | Janson et al. | |
| 4,163,342 A | 8/1979 | Fogg et al. | |
| 4,250,666 A | 2/1981 | Rakestraw | |
| 4,276,720 A | 7/1981 | Lyon | |
| 4,571,883 A | 2/1986 | Shaw | |
| 5,048,462 A | 9/1991 | Hostetler | |

(Continued)

FOREIGN PATENT DOCUMENTS

DE    2204583    8/1973

(Continued)

OTHER PUBLICATIONS

U.S. Appl. No. 09/952,964, Mar. 14, 2002, Hutchinson et al.

(Continued)

*Primary Examiner*—Francis T Palo
(74) *Attorney, Agent, or Firm*—Fulbright & Jaworski, LLP

(57) ABSTRACT

A storage platform for storing, watering and transporting plants, which is rectangular and has two mounting means on each of two parallel narrow sides for hanging in frame struts, where each mounting means has an insertion end portion running along the respective narrow side and ending freely in the direction of a first long side; and a watering device with at least two storage platforms arranged one on top of the other, with four vertical frame struts disposed on narrow sides of the storage platforms and provided with support recesses.

9 Claims, 18 Drawing Sheets

U.S. PATENT DOCUMENTS

| | | | |
|---|---|---|---|
| 5,355,618 A | 10/1994 | Pedersen et al. | |
| 5,673,511 A | 10/1997 | Holtkamp, Jr. | |
| 5,826,375 A | 10/1998 | Black et al. | |
| 5,956,893 A | 9/1999 | Harrison | |
| 5,957,060 A * | 9/1999 | Rosenband | 108/107 |
| 5,960,827 A | 10/1999 | Rosenberg et al. | |
| 5,987,812 A | 11/1999 | Knell | |
| 6,243,985 B1 | 6/2001 | Miller | |
| 6,286,694 B1 * | 9/2001 | Battaglia et al. | 211/187 |
| 6,470,625 B1 | 10/2002 | Byun et al. | |
| 6,526,897 B1 * | 3/2003 | Ondrasik | 108/110 |
| 6,695,231 B2 | 2/2004 | Dramm et al. | |
| 6,793,223 B2 * | 9/2004 | Ondrasik et al. | 280/47.35 |
| 6,820,757 B2 | 11/2004 | Craft et al. | |
| 6,843,022 B1 | 1/2005 | Holley | |
| 6,957,627 B1 | 10/2005 | Knippelmeir | |
| 2002/0029517 A1 | 3/2002 | Hutchinson et al. | |
| 2002/0152677 A1 | 10/2002 | Park | |
| 2002/0189163 A1 | 12/2002 | Cooper | |
| 2004/0035813 A1 | 2/2004 | Sparkowski | |
| 2005/0039390 A1 | 2/2005 | Sharples et al. | |
| 2005/0055877 A1 | 3/2005 | Schomaker et al. | |
| 2005/0081438 A1 | 4/2005 | Schomaker et al. | |

FOREIGN PATENT DOCUMENTS

| | | |
|---|---|---|
| DE | 2800575 | 7/1978 |
| DE | 3619262 | 12/1987 |
| DE | 10003837 A1 | 1/2000 |
| EP | 0409031 | 1/1991 |
| EP | 0614794 | 9/1994 |
| FR | 2297557 | 1/1976 |
| FR | 2805965 | 9/2001 |
| GB | 1 569 405 | 6/1980 |

OTHER PUBLICATIONS

U.S. Appl. No. 10/159,548, Dec. 19, 2002, Cooper.
U.S. Appl. No. 10/076,338, Aug. 21, 2003, Dramm et al.
French Patent FR 2805965 to Mieulet, Sep. 14, 2001, English Translation, 30 pages.

* cited by examiner

STORAGE PLATFORM FOR STORING AND WATERING PLANTS, AND WATERING DEVICE

CROSS-REFERENCE TO RELATED APPLICATIONS

This application claims priority to DE 202005005087.3 filed Mar. 31, 2005.

TECHNICAL FIELD

The invention relates to a storage platform for storing, watering and transporting plants, which is rectangular and has two mounting means on each of two parallel narrow sides for hanging them in frame struts; it also relates to a watering device formed with the storage platform.

BACKGROUND OF THE INVENTION

The mounting means in known, plate-like storage platforms of this kind, with which the storage platform is hung in the mounting openings or slots of, for example, frame struts of a mounting frame which is U-shaped in cross-section, may extend in the longitudinal direction of the storage platform, so that the storage platform is inserted, or hung in, in its longitudinal direction. In other words, a storage platform is hung in four vertical frame struts disposed at corners of a rectangle, by first of all inserting two mounting means, which are disposed at a common front or narrow side of the storage platform, in desired support recesses in two corresponding frame struts; in the process, because of the fixed mutual spacing between the four frame struts, the storage platform has to be tilted about a transverse axis running perpendicular to the long sides of the storage platform in order to be able to move it between the frame struts. After the two above-mentioned mounting means have been pushed completely, or as far as possible, into their support recesses, the storage platform can be placed in a horizontal position, so that the remaining, opposite mounting means associated with the other narrow side of the storage platform come into alignment with corresponding support recesses in the other two frame struts and can be inserted into them by displacing the storage platform substantially horizontally. In most cases, engagement recesses are provided, so that, whenever all four mounting means are pushed to approximately the same depth into the corresponding support recesses, they co-operate with the support recesses in a positive fit by means of the engagement recesses, thus ensuring a firm, immovable support.

In addition, storage platforms are known in which the mounting means with which they are hung in the mounting openings or slots of, for example, frame struts of a mounting frame that are U-shaped in cross-section extend in the transverse direction of the storage platform, so that the process of inserting them or hanging them in takes place in the transverse direction of the storage platform. A storage platform of this kind is hung in four vertical frame struts disposed at corners of a rectangle by first of all inserting two mounting means, which are disposed at a common long side of the storage platform, in desired support recesses in two corresponding frame struts. In the process, because of the fixed mutual spacing between the four frame struts, the storage platform has to be tilted about a transverse axis running perpendicular to the narrow sides of the storage platform in order to be able to move it between the frame struts. After two mounting means have been pushed into their support recesses, the storage platform can be placed in a horizontal position, so that the remaining, opposite mounting means associated with the other long side of the storage platform come into alignment with corresponding support recesses in the other two frame struts and can be inserted into them by displacing the storage platform substantially horizontally. Here too, engagement recesses are provided in most cases, so that, whenever all four mounting means are pushed to approximately the same depth into the corresponding support recesses, they co-operate with the support recesses in a positive fit by means of the engagement recesses, thus ensuring a firm, immovable support.

These arrangements have proven their worth in practice. An occasional disadvantage, however, is that hanging the storage platform in and out is felt to be relatively time-consuming because of the need to move it to and fro.

The object of the invention consists in providing a storage platform in which the frame struts can be inserted and removed more quickly and more simply.

BRIEF SUMMARY OF THE INVENTION

This object is achieved in accordance with the invention by a storage platform for storing and watering plants, which is rectangular and has two mounting means on each of two parallel narrow sides for hanging them in frame struts, the storage platform being characterised in that each mounting means has an insertion end portion running along the respective narrow side and ending freely in the direction of a first long side.

This makes it possible to insert or remove the storage platform in the transverse direction in the course of a single movement in only one direction, so that the disadvantages described above are avoided. In the context of the present invention, the expression "inserting in the transverse direction" means that, when the insertion end portions of the mounting means are inserted into or removed from support means of the frame struts co-operating therewith, e.g. support recesses, the rectangular storage platform merely has to be moved to or fro in its transverse direction in order to engage or disengage the mounting means, but not in its longitudinal direction. Moreover, no combination or succession of to and fro movements is needed, but only a movement in a single direction.

The invention proposes that either two or all four insertion end portions of the mounting means are each disposed in one corner region of the storage platform. In a first variant, this means that two insertion end portions adjacent to the first long side are disposed in corner regions of the storage platform associated with the first long side, while the other two insertion end portions are disposed in the opposite corner regions. In a second variant, two insertion end portions adjacent to the first long side are disposed in corner regions of the storage platform associated with the first long side, while the other two insertion end portions are disposed in positions between the long sides, i.e. staggered relative to the corner position in a direction towards the middle of the respective narrow side.

The mounting means may be offset, such as by being formed in an L-shape and may have a supporting arm and an insertion arm forming the insertion end portion.

The supporting arms can be fastened to a side wall, and the insertion end portions can have at least one recess, especially two opposed recesses, for hanging in frame struts in a positive fit.

The narrow sides between the mounting means are preferably each provided with a protrusion, within each of which an overflow can be disposed.

The invention further proposes that the storage platform should preferably be pan-like in form and should have an overflow for defining a desired level of liquid. For this purpose, the storage platform can be provided with side walls. In order to set a desired level of liquid, the overflow can be infinitely or gradually height-adjustable. In addition, the overflow may have a tubular drainage member mounted in a fixed or height-adjustable manner in an opening in the storage platform. The overflow or the drainage member may be gradually or infinitely height-adjustable. The drainage member or the overflow can have visual marks and/or mechanical retaining means in predetermined positions and can be provided with at least one drainage opening pointing to the side. Furthermore, the overflow or the drainage member can be rotatably mounted in the opening, optionally with a limit on the angle of rotation. In this way, the jet of water draining out in a watering device can be directed precisely onto a storage platform located below.

In order to form the overflow, a height-adjustable slide member can be associated with an opening in a side wall of the storage platform.

With regard to the watering device, the object of the invention is achieved by a watering device with at least two storage platforms arranged one on top of the other for storing and watering plants, the storage platforms being rectangular and having two mounting means on each of two parallel narrow sides for hanging them in support recesses of frame struts, with four vertical frame struts disposed in corner regions of the storage platforms and provided with support recesses for hanging the mounting means in, each mounting means having an insertion end portion running along the respective narrow side and ending freely in the direction of a first long side. This ensures that the storage platforms can be inserted and removed in the transverse direction and without moving them to and fro.

The storage platforms may be arranged in such a way that any liquid draining away via the overflow of a/each storage platform can flow into a storage platform below, especially one arranged immediately adjacent to it The frame struts are preferably L, U or C-shaped, rectangular or tubular profiles.

BRIEF DESCRIPTION OF THE DRAWINGS

Further benefits and features of the invention will become apparent from the following description of working embodiments, reference being made to a drawing, in which.

DETAILED DESCRIPTION OF THE INVENTION

In known, rectangular, flat storage platforms, mounting means are designed in the form of insertion end portions such as hooks, pins or the like projecting on narrow sides in the longitudinal or transverse direction. A storage platform of this kind is intended for hanging or inserting in a rack which has four vertical frame struts arranged at the corners of a rectangle. The mutual free spaces between the frame struts and the mass of the storage platform are matched in such a way that the storage platform can be inserted into the rack or frame struts in the longitudinal direction in the manner described below. In the process, two hooks are first of all inserted with their free end portions (hereinafter also referred to as insertion end portions), which are located on a common long or narrow side of a storage platform, into corresponding support recesses in two frame struts disposed on a long or narrow side of said rectangle, and are pushed into them as far as possible by moving the storage platform in its transverse or longitudinal direction. During this process, the storage platform must be tilted at a slanted angle in order to create a maneuvering space between the hooks and the frame struts opposite the hooks to be inserted, or which have already been inserted. Proceeding from this slanted position, the storage platform can now, once two hooks have been inserted, be placed in a substantially horizontal position, so that the hooks on the opposite side of the storage platform come into alignment with corresponding support recesses in the opposite frame struts of the rack and can be inserted into them by moving the storage platform in the opposite direction. In the process, the hooks, which have previously been inserted and pushed in completely, are partially moved back out again until, finally, all four insertion end portions are located at approximately the same depth in the four support recesses in the frame struts. In this position, recesses in the insertion end portions can co-operate with the edges of the recesses in the frame struts to create a positive fit, so that the storage platform is immobilised in the desired position.

In the embodiment of the storage platform in accordance with the invention, the need to move the storage platform to and fro no longer exists, because the design of the mounting means makes insertion possible in the transverse direction with a single movement.

Figure 1:
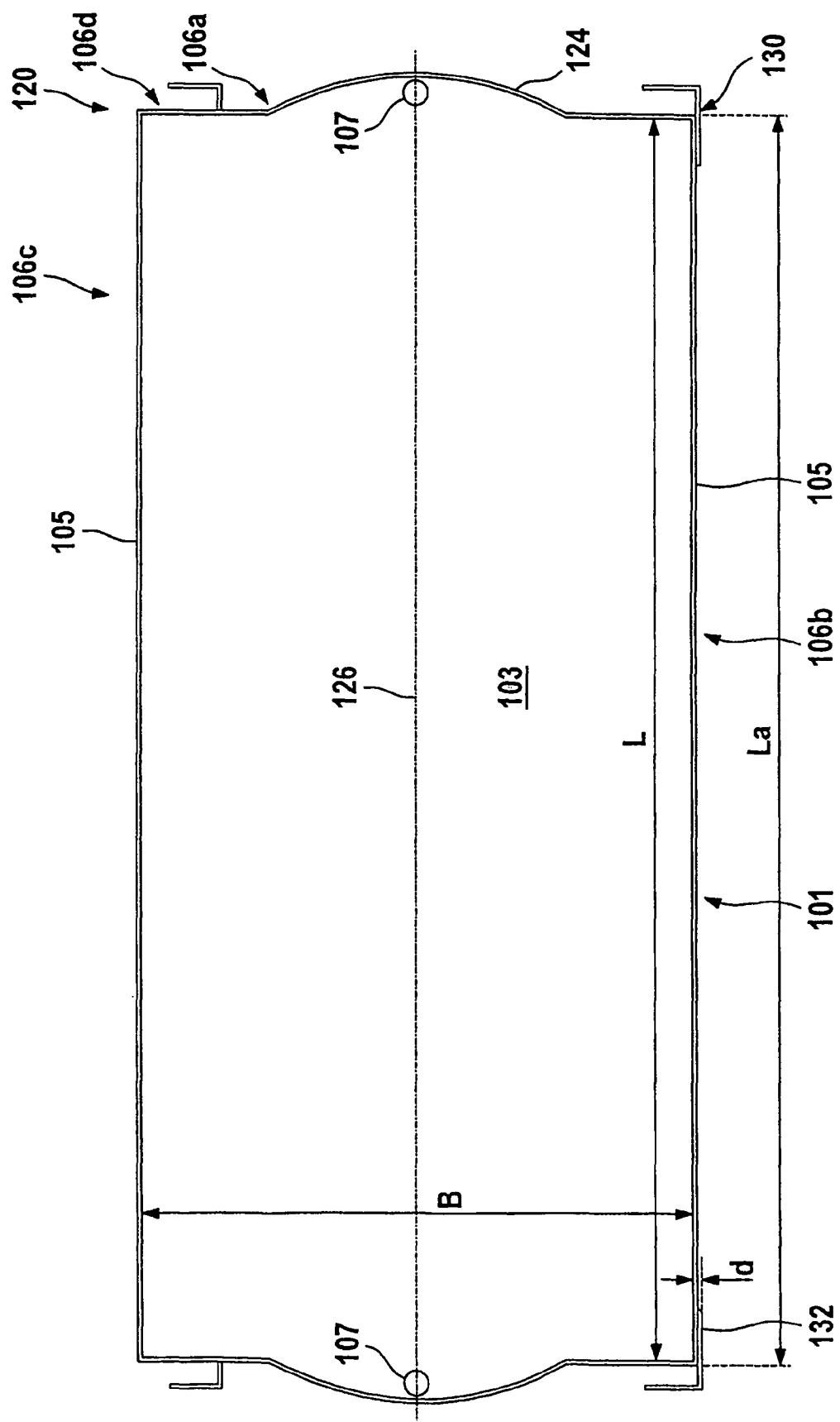
FIG. 1 shows a top view of a first embodiment of a storage platform in accordance with the invention.
Figure 2:
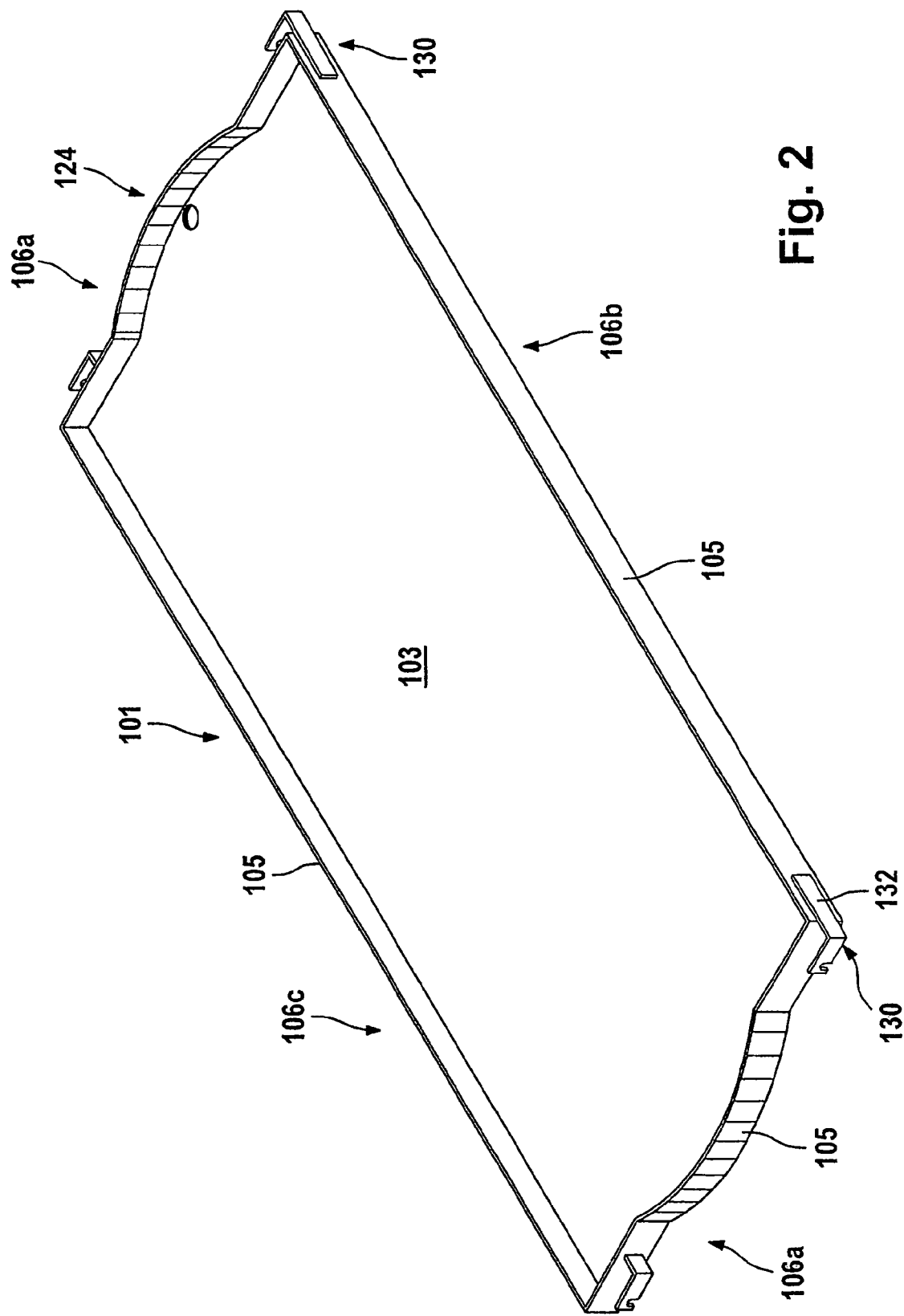
FIG. 2 shows a perspective view of the storage platform according to FIG. 1.
Figure 3:
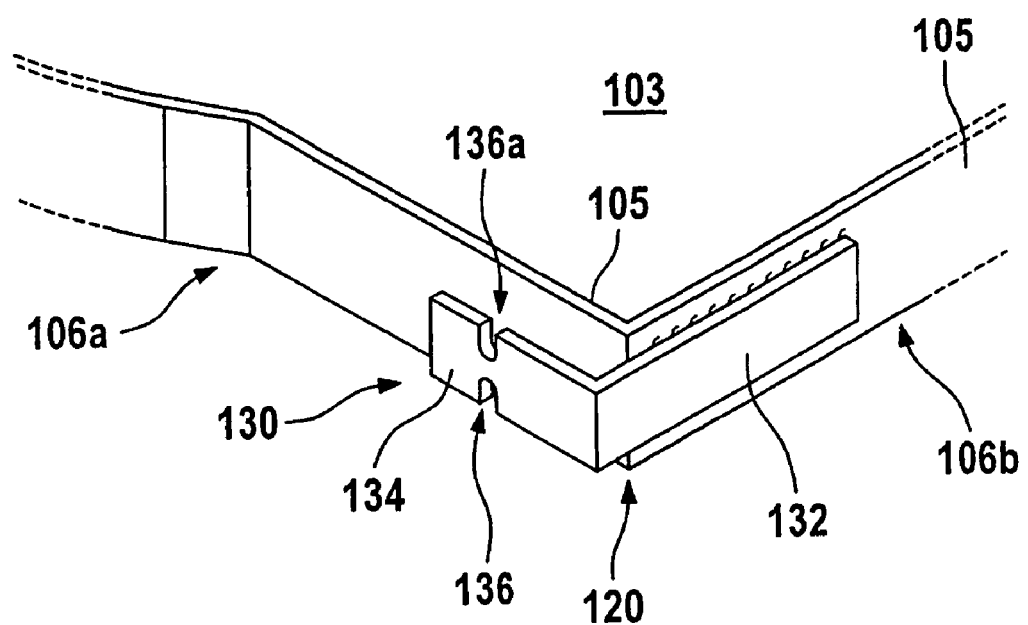
FIG. 3 shows an enlarged portion of the storage platform according to FIGS. 1 and 2.

FIGS. 1 to 3 illustrate the structure of a first embodiment of a storage platform in accordance with the invention 101, which is pan-like in form, with side walls, and has a height-adjustable overflow in order to define a desired level of liquid within the pan-like storage platform. The advantage of this is that the water which is not immediately taken up by the plants does not flow away at once, but the water level is retained by the side walls and controlled by the overflow and, when a number of storage platforms are arranged one on top of the other, the water can flow from one storage platform into the one immediately below it. The number and arrangement of overflows in each individual storage platform depends on considerations of what is appropriate.

The storage platform 101 is generally rectangular with a floor 103, side walls 105, long sides 106b, 106c and narrow sides 106a, corners 120 and two openings 107, in which are located overflows 109 which are not shown here (but which are explained further below in connection with FIG. 4). In the area of each of the narrow sides 106a, a protrusion 124 is provided, within which the opening 107 is located. The protrusion 124 is arcuate in the embodiment illustrated, though it could also be some other shape, such as rectangular, triangular or something else. The purpose of the protrusion 124 is to enable the opening 107, or the overflow 109, to be disposed outside a rectangular storage surface with dimensions L×B, which is defined by the long sides 106b, c and by straight portions 106d of the narrow sides 106a or, in other words, by the corners 120 of the storage platform 101 (length L, breadth B of the inner useful area or floor space of the storage platform).

Figure 9:
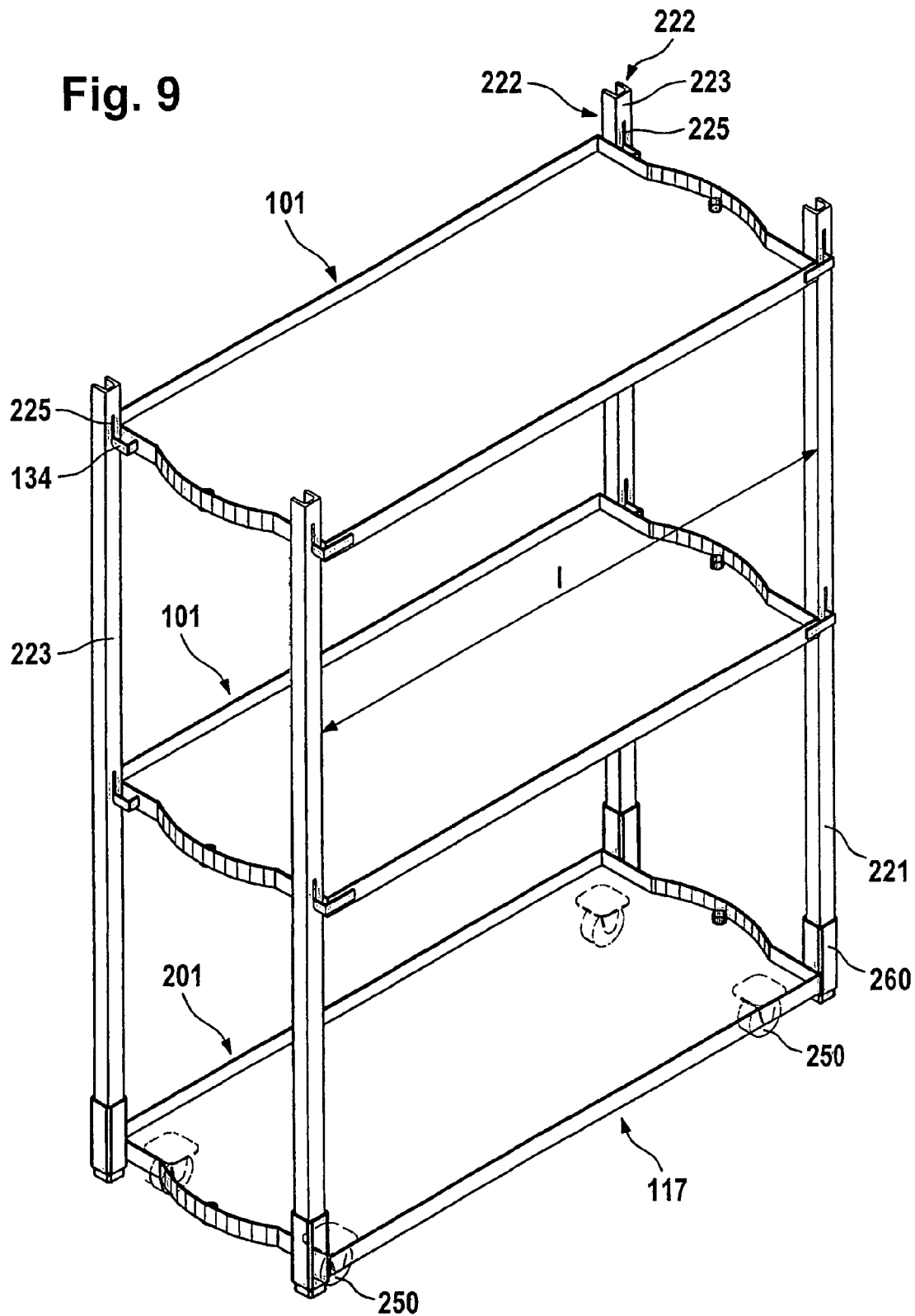
FIG. 9 shows a perspective view of a first embodiment of a watering device in accordance with the invention.
Figure 10:
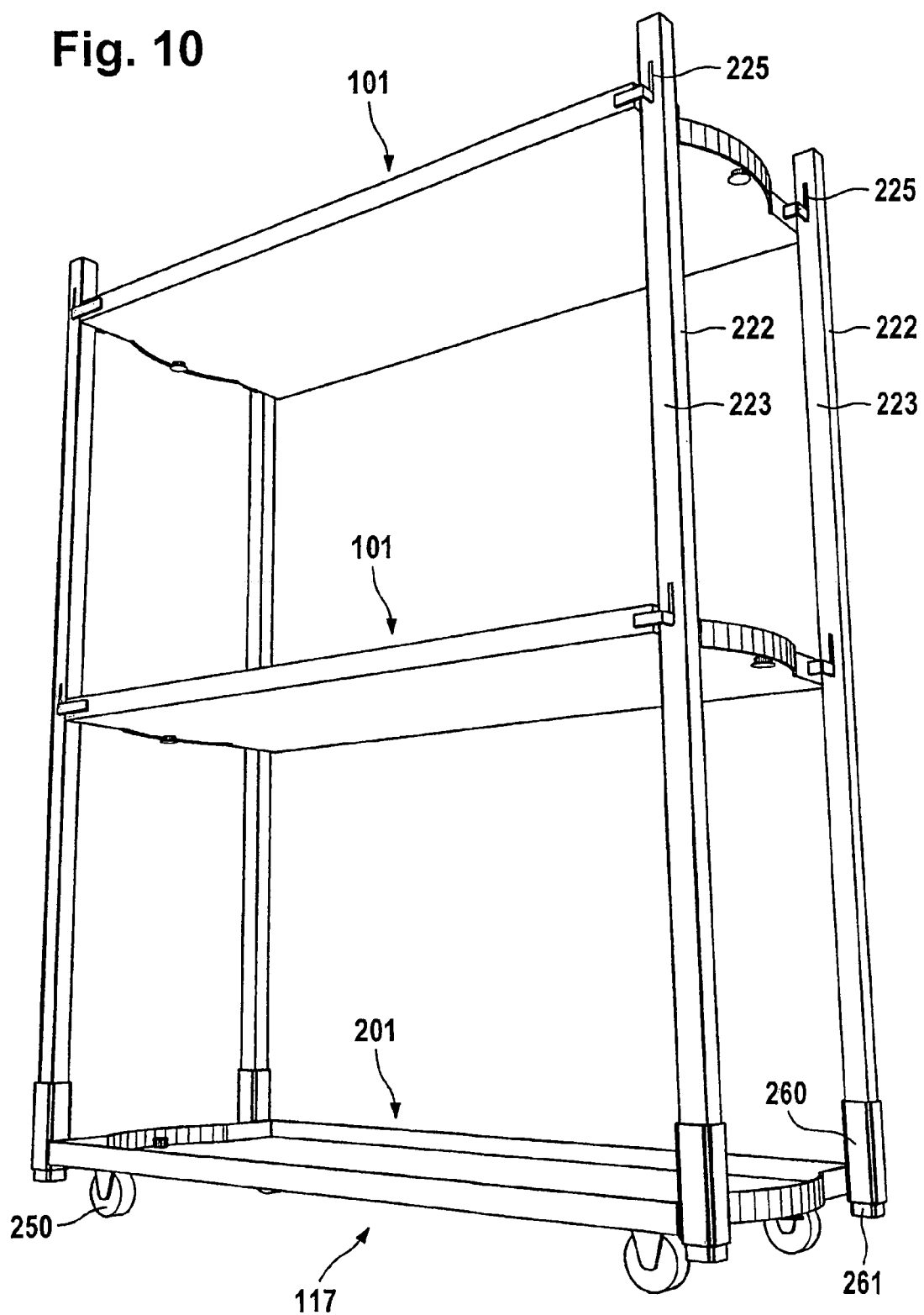
FIG. 10 shows the watering device according to FIG. 9 from a different angle.
Figure 11:
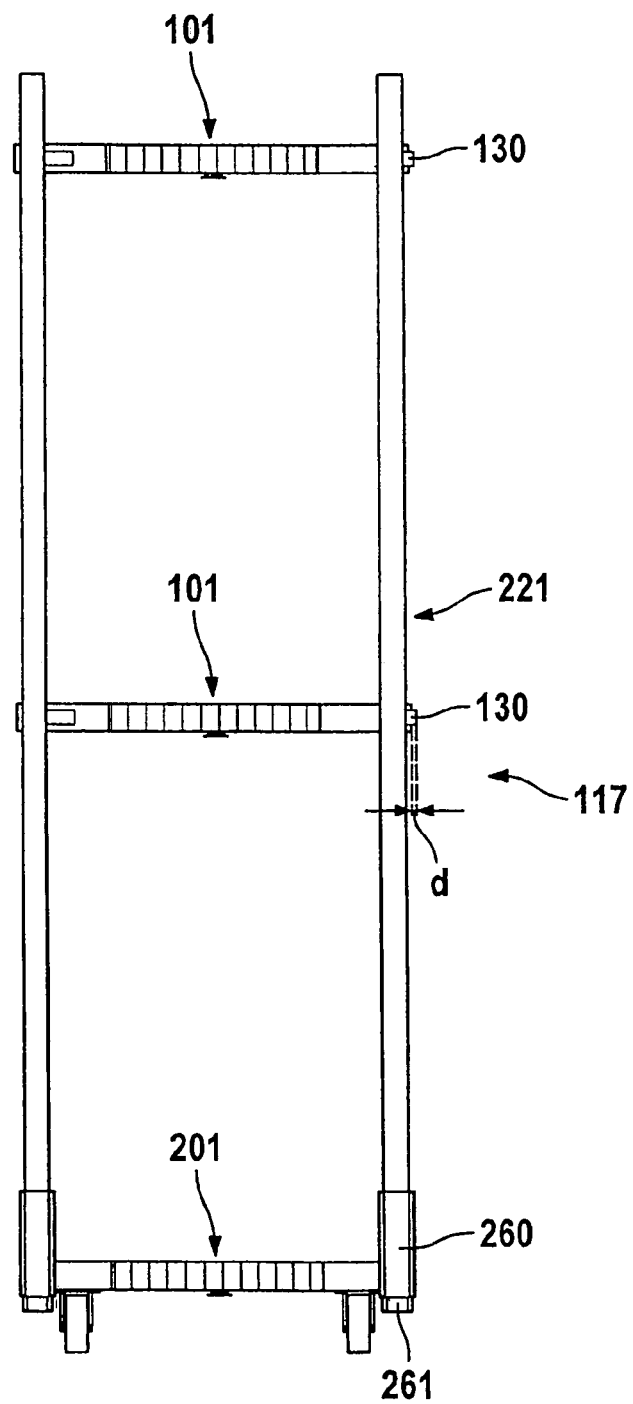
FIG. 11 shows the watering device according to FIGS. 9 and 10 in a front view.

Arranging the overflow 109 within the above-mentioned rectangular storage surface of the storage platform would be disadvantageous. This is because plant vessels are usually placed on the storage platform in shared rectangular boxes, each holding six individual plant vessels, for example, the length of a shared box corresponding to the breadth B of the storage platform and the breadth of the latter corresponding to an integral fraction of its length L. An arrangement of this kind is only possible within the rectangular storage surface described, because there would otherwise only be room for one box fewer. On the other hand, the length L of the storage surface is determined by the fact that the dimensions and spacings between frame struts in a watering device according to FIGS. 9 to 11 are laid down in practice by the large number of watering devices already in existence. In this context, the dimensions L, B of the storage platform, within which there should be no overflow, are also laid down indirectly.

Figure 4:
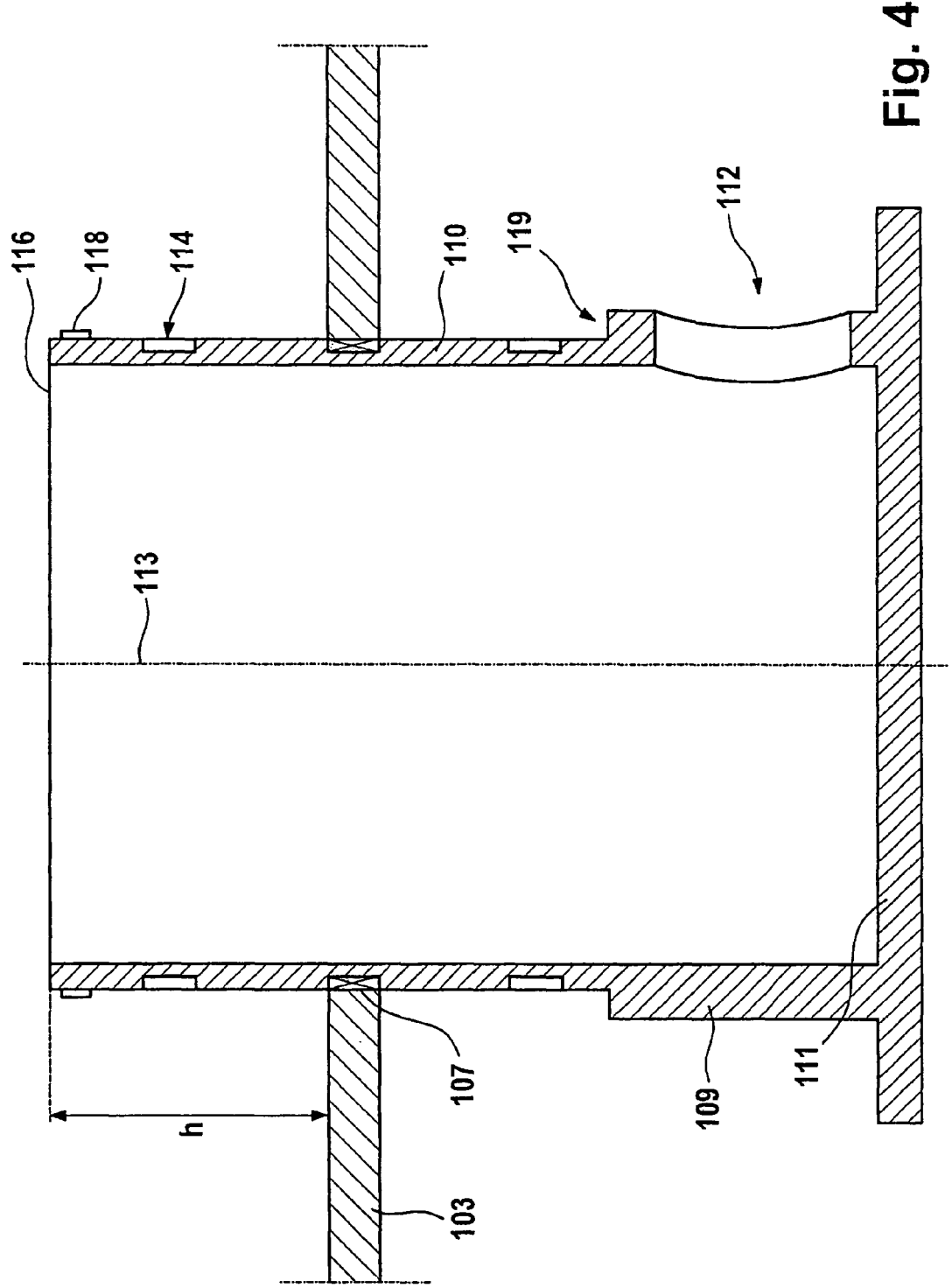
FIG. 4 shows a section view of an overflow of the storage platform according to FIGS. 1-3.
Figure 5:
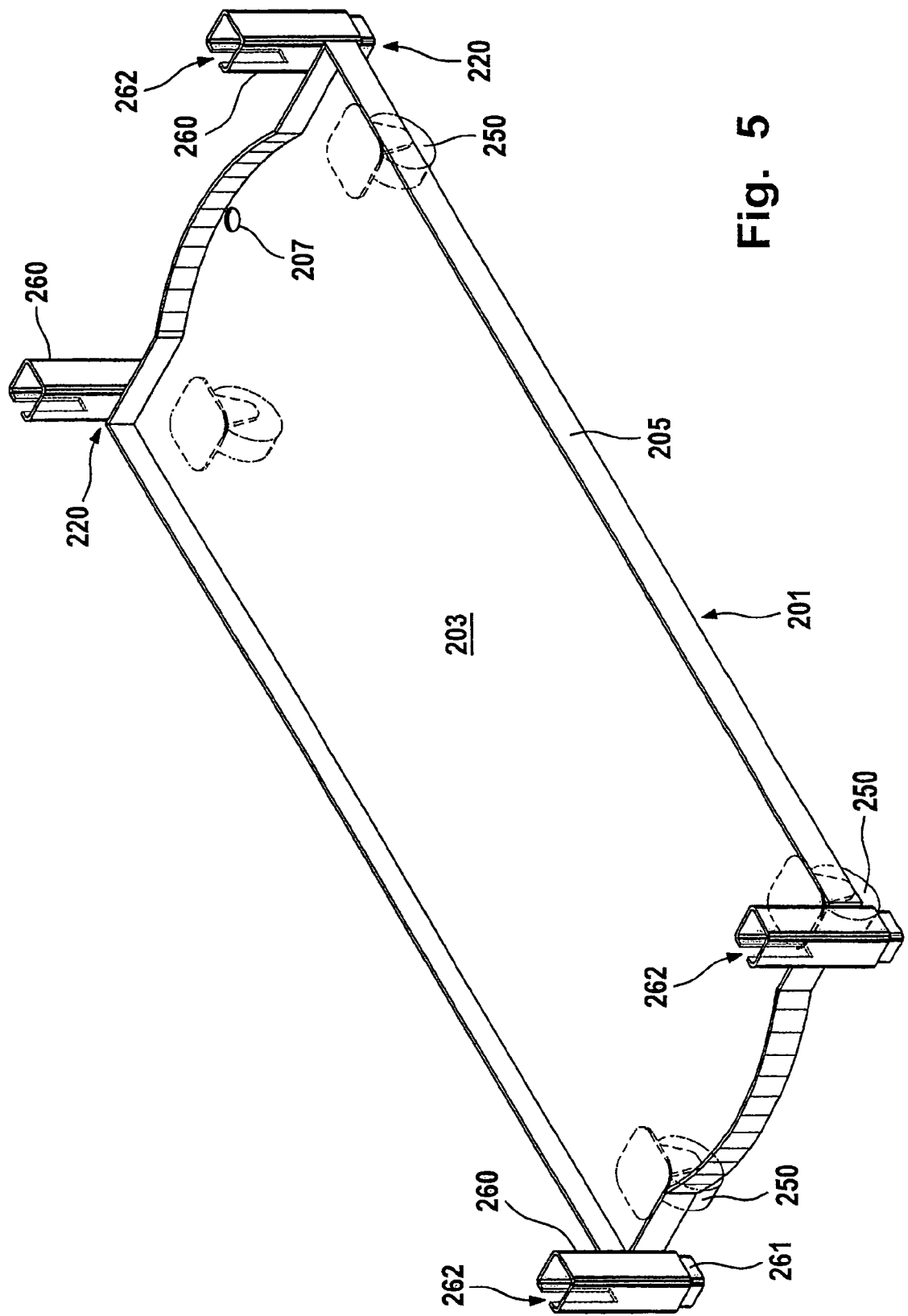
FIG. 5 shows a perspective view of a base platform according to a first embodiment.
Figure 6:
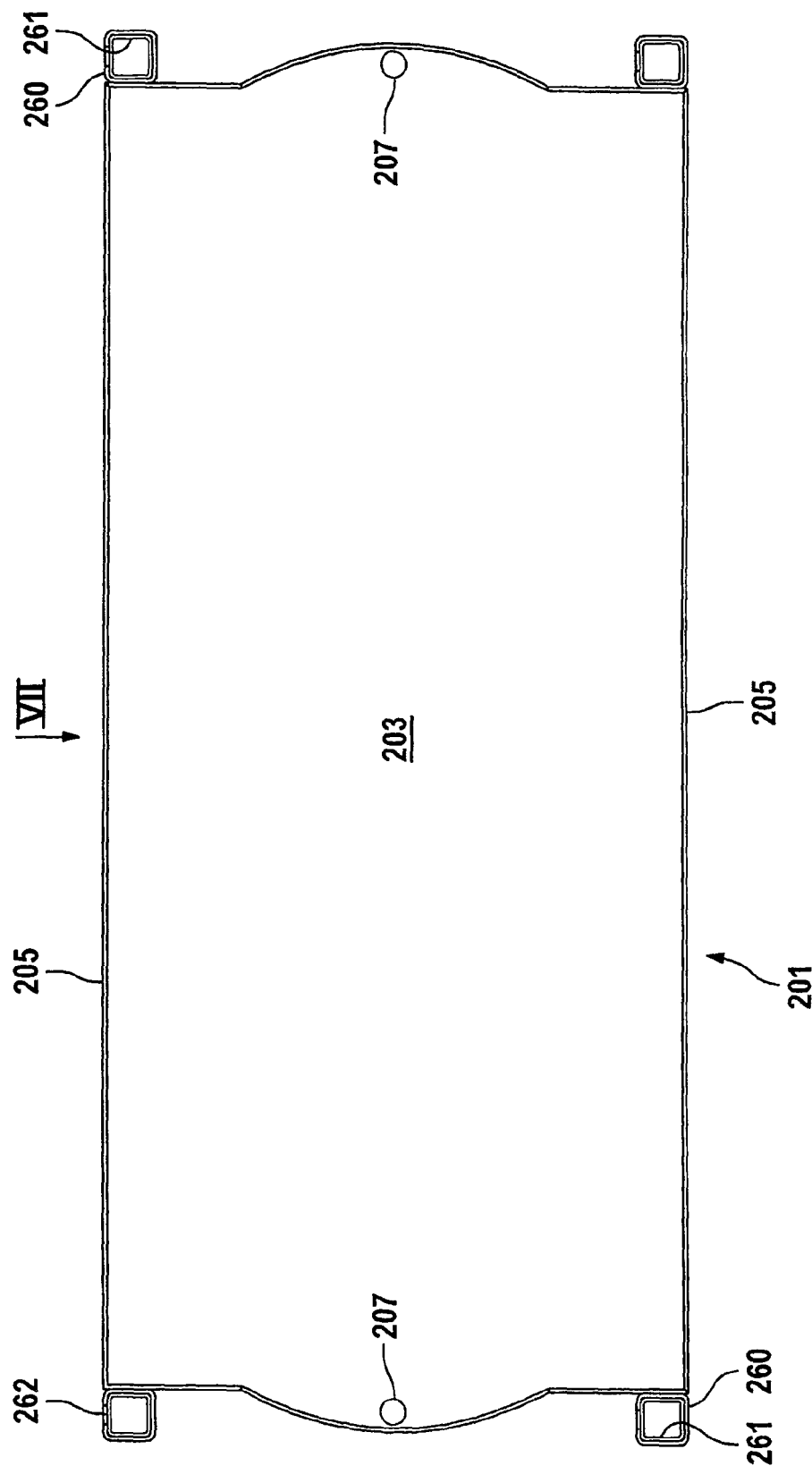
FIG. 6 shows a top view of the base platform according to FIG. 5.

FIG. 4 shows an embodiment of an overflow or drainage member 109, which is inserted in the opening 107 of the floor 103.

The overflow 109 consists of a cylindrical base body 110, which is open in one direction (top) and is closed off at a bottom end by a circular bottom wall 111. A drainage opening 112 allows water which flows into the cylindrical base body 110 from above over a rim 116 to drain away. By turning the overflow 109 about its longitudinal axis 113, it is possible to determine the direction of the drainage opening 112 and thus the direction in which the water draining away flows. In this way, it is possible to ensure that the jet of water draining away lands on a storage platform below. It can also be provided for the angle of rotation to be stopped or limited. It goes without saying that a plurality of drainage openings 112 are also possible, which are distributed around the circumference of the base body 110. In order to create an inspection opening, it may be possible for the bottom wall to be partially or completely folded down or it may be provided with an opening and a plug member.

As FIG. 4 also shows, the base body 110 is provided on its outside with a number of engagement members 114 (recesses or projections), which make it possible to adjust the height at predetermined intervals, i.e. so that the upper rim 116 of the base body 110 is a desired height h above the floor 103, thus determining a maximum water level or height h above the floor.

Because of the stop 118, even when the overflow 109 is lowered completely, a residual amount of water is always left in the storage platform. If it is desired to empty it totally, this can be done by arranging a notch in the overflow and/or by providing an indentation in the floor 103 in the region of the opening 107. In addition, it can be provided that the floor 103 itself is designed to be curved or domed, so that, first of all, greater stability is achieved and secondly a slope is created, so that the water always flows down in the direction of the overflow(s). This ensures that the storage platform can be emptied completely and is effectively free of water when removed.

Instead of the engagement members 114, visual marks may also be provided, which make it easier to set a desired height h. A stop 118 is provided in the region of the upper rim 116, which prevents the overflow 109 from being pulled completely out of the opening 107, or at least makes it difficult to do so. A shoulder 119 defines a maximum level that can be set (overflow 109 pushed all the way to the top).

As FIGS. 1 and 2 and especially FIG. 3 show on an enlarged scale, mounting means 130 are disposed on the side walls 105 in the area of the narrow sides 106a of the storage platform 101, near the corners 120, or near the long sides 106b, 106c; in the embodiment illustrated, these mounting means are bent or L-shaped, and each has a supporting arm 132 which is attached, e.g. welded, to a side wall 105 (in the area 106b or 106a), and also an insertion arm 134 extending from the supporting arm. All the insertion arms 134 end freely in the direction of a long side 106c (also referred to as the "first long side") and are arranged perpendicular to the latter and parallel to the respective narrow side 106a. As is shown in particular by FIG. 3, each insertion arm 134 has a V-shaped, semicircular or slot-like recess 136 so that the storage platform 101 can be hung in frame struts of a watering device in a way that will be explained below. In addition, the insertion arm 134 can be provided with a second recess 136a, which makes it possible to hang in the storage platform in an inverted position, as will be explained.

Two of the four mounting means 130 must protrude laterally to a slight extent beyond the long side 106b, namely by a dimension d corresponding to the thickness of the wall of the supporting arm 132, so that the four frame struts 221 (FIG. 16 and FIGS. 9 to 11) can be arranged precisely in the corner regions of the storage platform, so that the outer edges or surfaces of the frame struts are in one plane with the long sides 106b, c.

Figure 7:
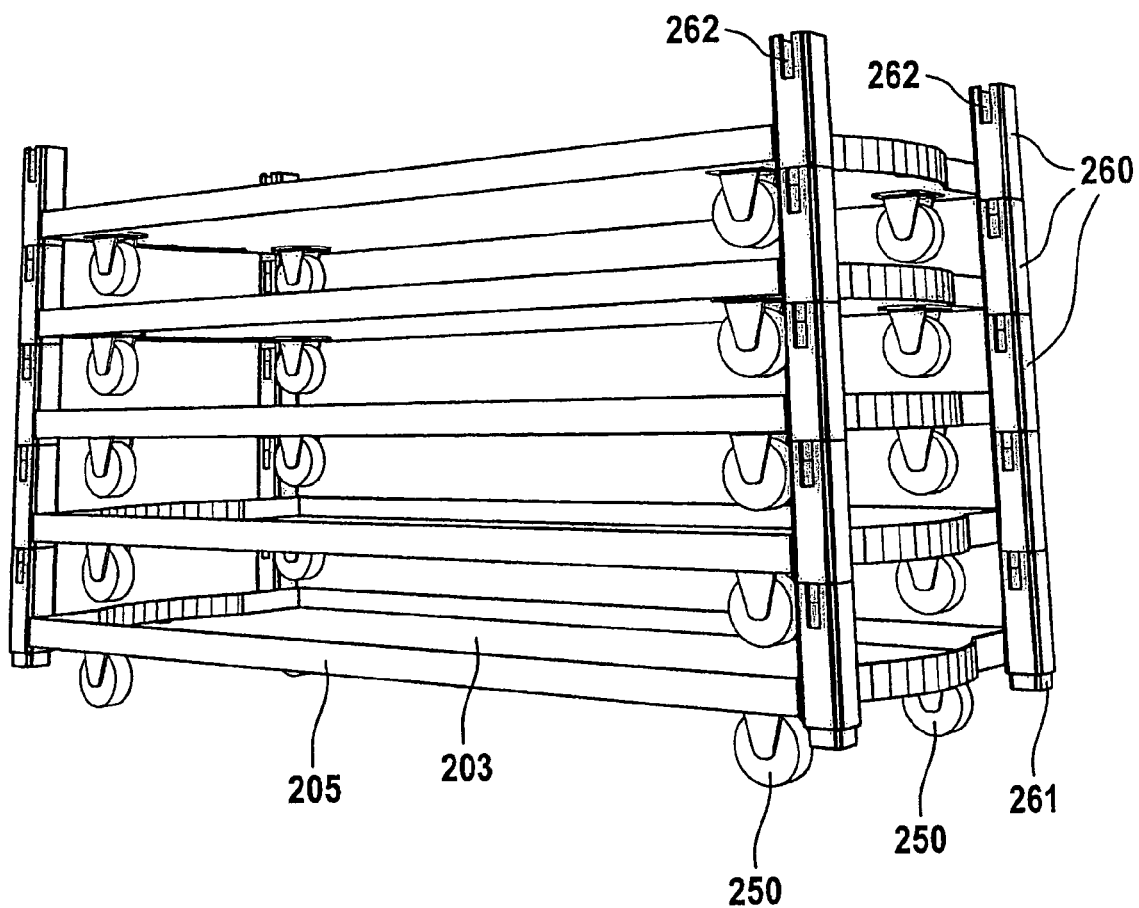
FIG. 7 shows a perspective view of several base platforms according to FIGS. 5 and 6 stacked one on top of the other, seen in direction VII in FIG. 6.
Figure 8:
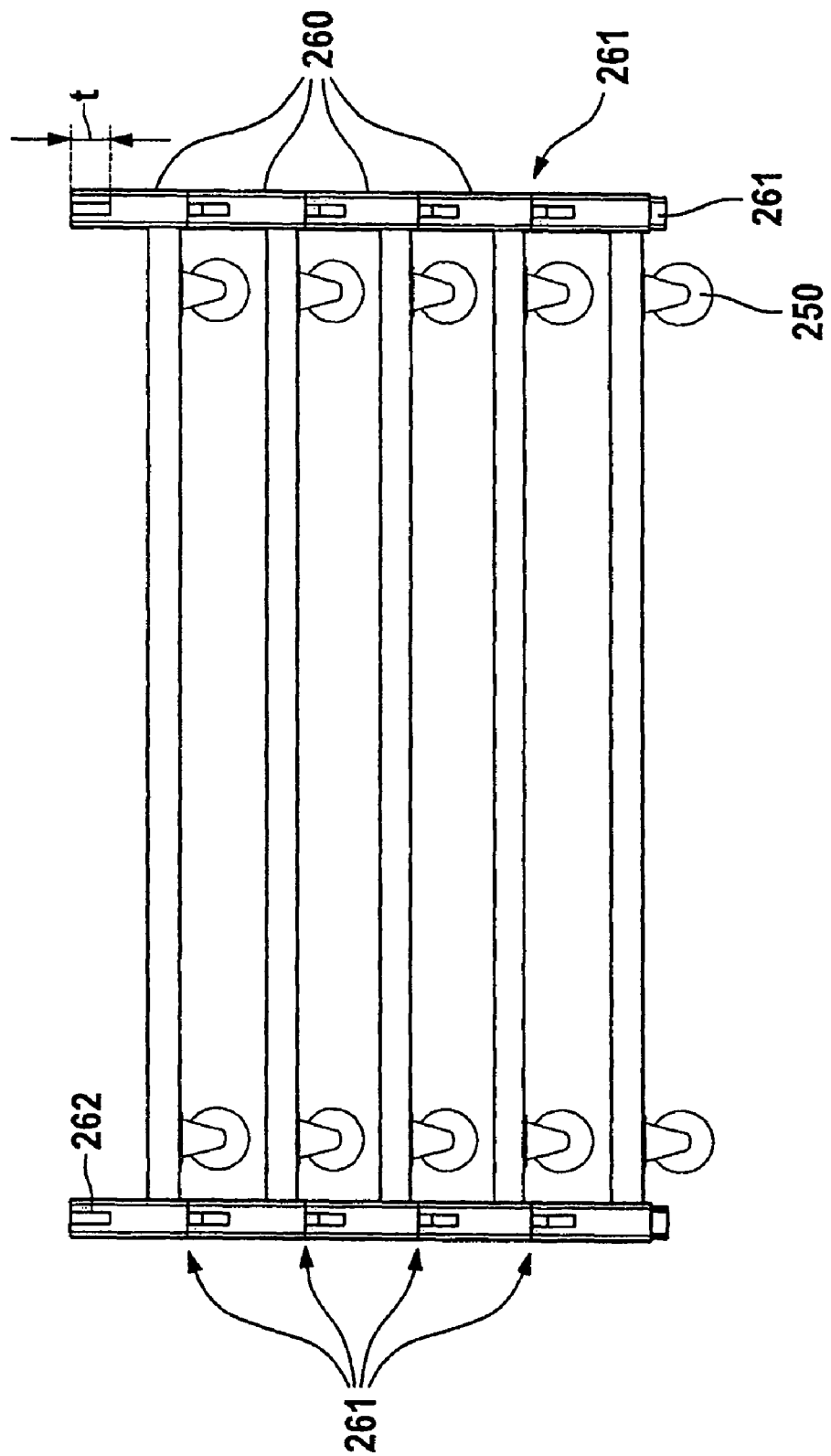
FIG. 8 shows a side view corresponding to FIG. 7.
Figure 16:
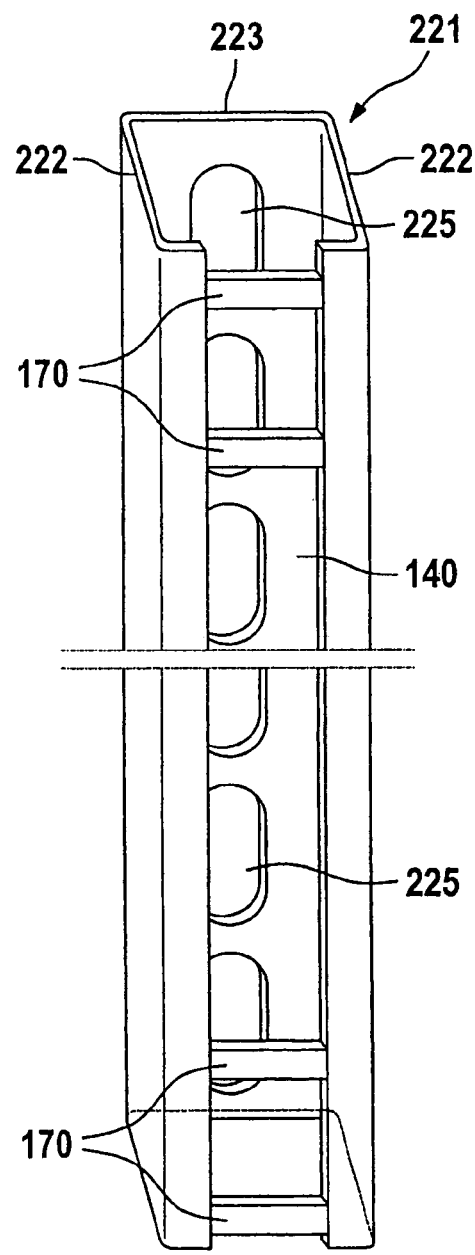
FIG. 16 shows a schematic view of a frame strut.

FIGS. 5 to 8 are schematic illustrations of a first embodiment of a base platform 201 to create a watering device in accordance with the invention (FIGS. 9 to 11). The base platform has a subframe, which is not shown separately, with rollers 250 attached to the underside, and which has a support means 260 attached in the area of each corner 220 for a frame strut 221 (which is explained further down and is illustrated in FIG. 16). A floor 203 and a peripheral side wall 205 form a pan-like receptacle for plants or the like. In this example, the support means 260 are rectangular tubes with a square cross-section, which are disposed in the corner regions, and in this case are fastened to the floor 203 and side walls 205; near the bottom of these rectangular tubes, stop members 261 are inserted in the form of smaller and shorter pieces of rectangular tube, the external contour of which corresponds to the internal contour of the rectangular tubes 260. On the one hand, this measure creates a stop for a frame strut pushed into the support means 260 from above, where an external contour of the frame strut corresponds substantially to the internal contour of the support means 260 or at least fits into it, and, on the other hand, the areas of the stop members 261 projecting downwards make it possible for a number of base platforms 201 to be stacked, as is illustrated in FIGS. 7 and 8. It goes without saying that the support means 260 could have a differently shaped cross-section, e.g. to receive frame struts with a non-square cross-section (rectangular, C, U or L-shaped, round or some other shape). As an alternative to the construction with a subframe, the support means 260 may be attached to the side walls 205 and the rollers to the floor 203.

FIGS. 9 to 11 show different views of a first embodiment of a watering device in accordance with the invention, with a base platform 201 according to FIGS. 5 to 8, two storage platforms 101 according to FIGS. 1 to 3 and four frame struts 221 inserted into the support means 260 of the bottom storage platform 201.

The frame struts 221 are designed in this case as U-shaped sections, the cross-sectional shape or external contours of which are square (web and limbs the same length) and which can be inserted into the support means 260 with little play, the stops 261 laying down a defined insertion depth for the frame struts. Their clearance 1, seen in the longitudinal direction of the storage platforms, corresponds to the external length La (FIG. 1) of the storage platforms.

As FIGS. 9 and 10 also show, the frame struts 221 are inserted into the support means 260 in such a way that limb portions 222 are perpendicular to the long sides 106b, c of the storage platforms 102, 201, while web portions 223 of the frame struts 221, which connect the limb portions 222, are arranged substantially parallel to the long sides 106b, c and pointing in one and the same direction relative to the limb portions (FIGS. 9, 10 towards the front right). The web portions 223 are each provided, at a desired height, with insertion slots or recesses 225 running vertically, i.e. in the longitudinal direction of the struts (see also FIG. 16), in which the insertion arms 134 are hung. In the process, the recesses 136 surround the web portions 223, the width of the recesses 136 corresponding substantially to the wall thickness of the material of the web portions 223.

If the insertion end portions of the storage platform are each provided with two opposing recesses 136, 136a (FIG. 3), the storage platforms can be hung in with their top side facing downwards for storage or transport purposes (without plants), so that no rainwater can collect in them.

Figure 12:
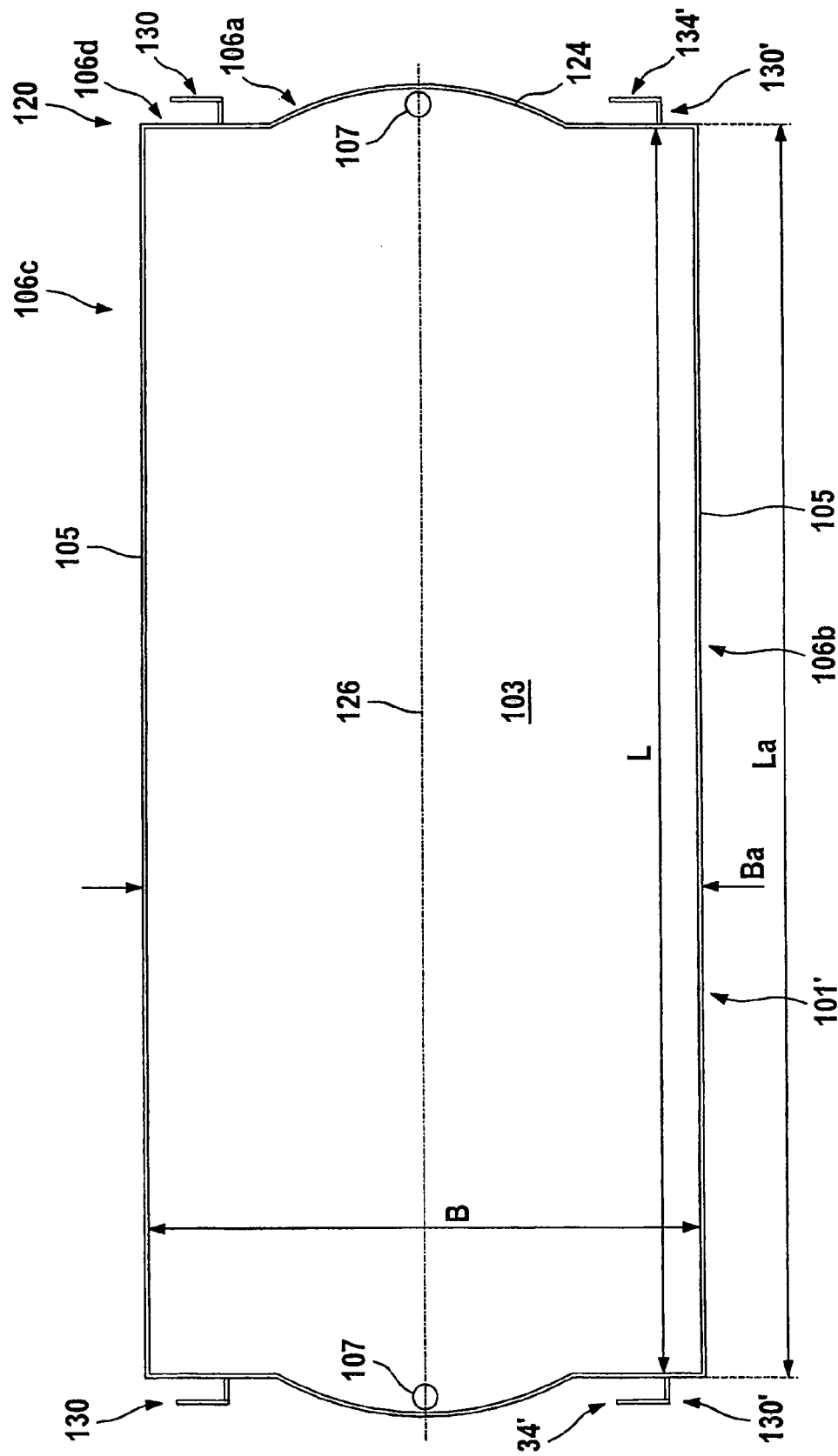
FIG. 12 shows a top view of a storage platform according to a second embodiment.

FIG. 12 shows a top view of a storage platform 101' according to a second embodiment, which is substantially the same as the storage platform 101. The only difference is the arrangement of the mounting means 130' illustrated at the bottom of FIG. 12, which have been shifted towards the middle of the respective narrow side 106a of the storage platform compared to the embodiment according to FIGS. 1 to 3. In particular, the insertion arms 134' of the two mounting means 130', which are attached in a displaced location, are positioned such that the associated frame struts into which they are to be hung are likewise displaced compared to the arrangement according to FIG. 9. The advantage of this embodiment is that the mounting means 130' do not protrude laterally outwards by the wall thickness, as is the case in FIG. 1, but are disposed completely within the external breadth dimensions Ba of the storage platform, which is laid down by the long sides 106b, c.

Figure 13:
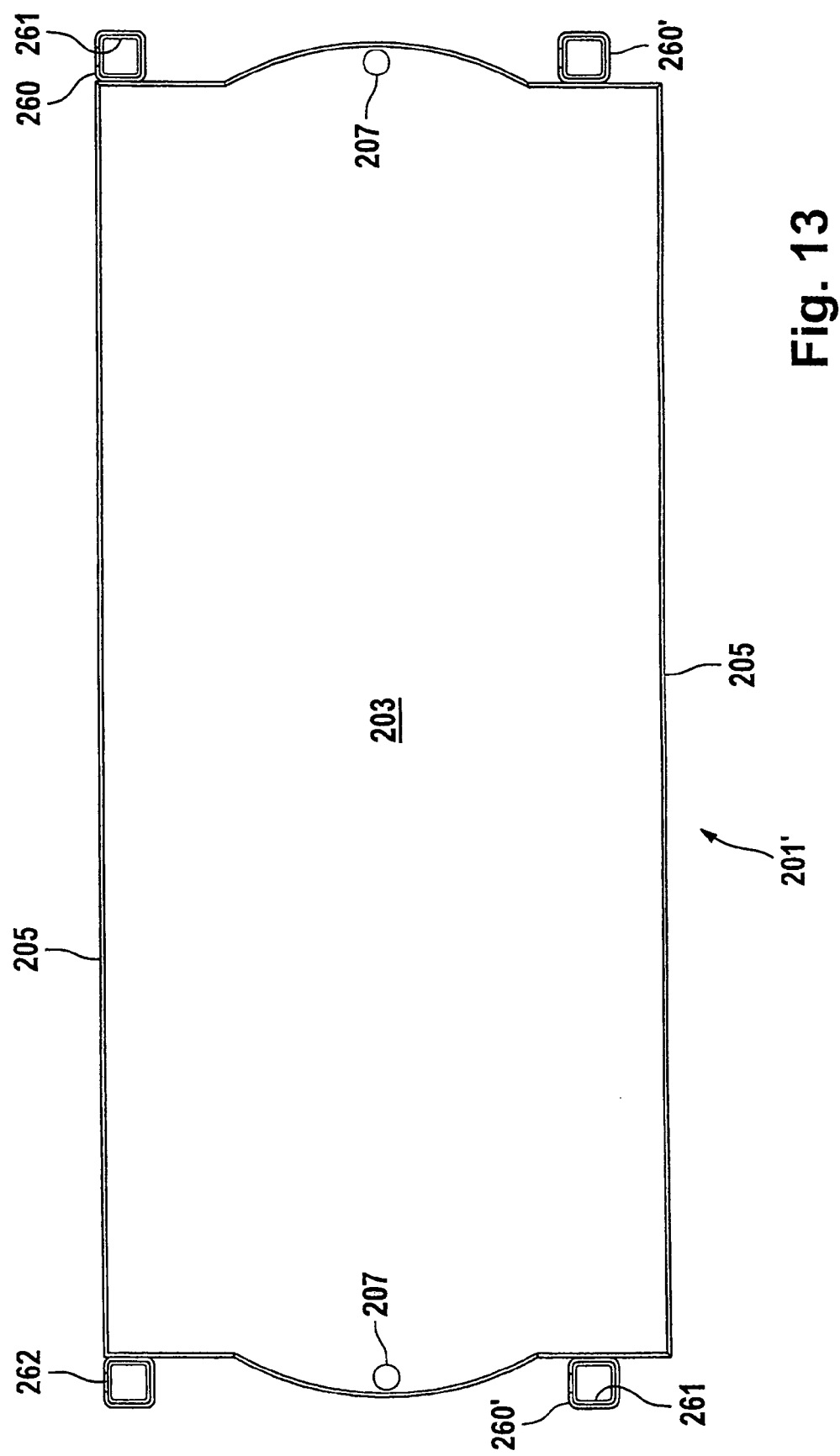
FIG. 13 shows a top view of a base platform according to a second embodiment.
Figure 14:
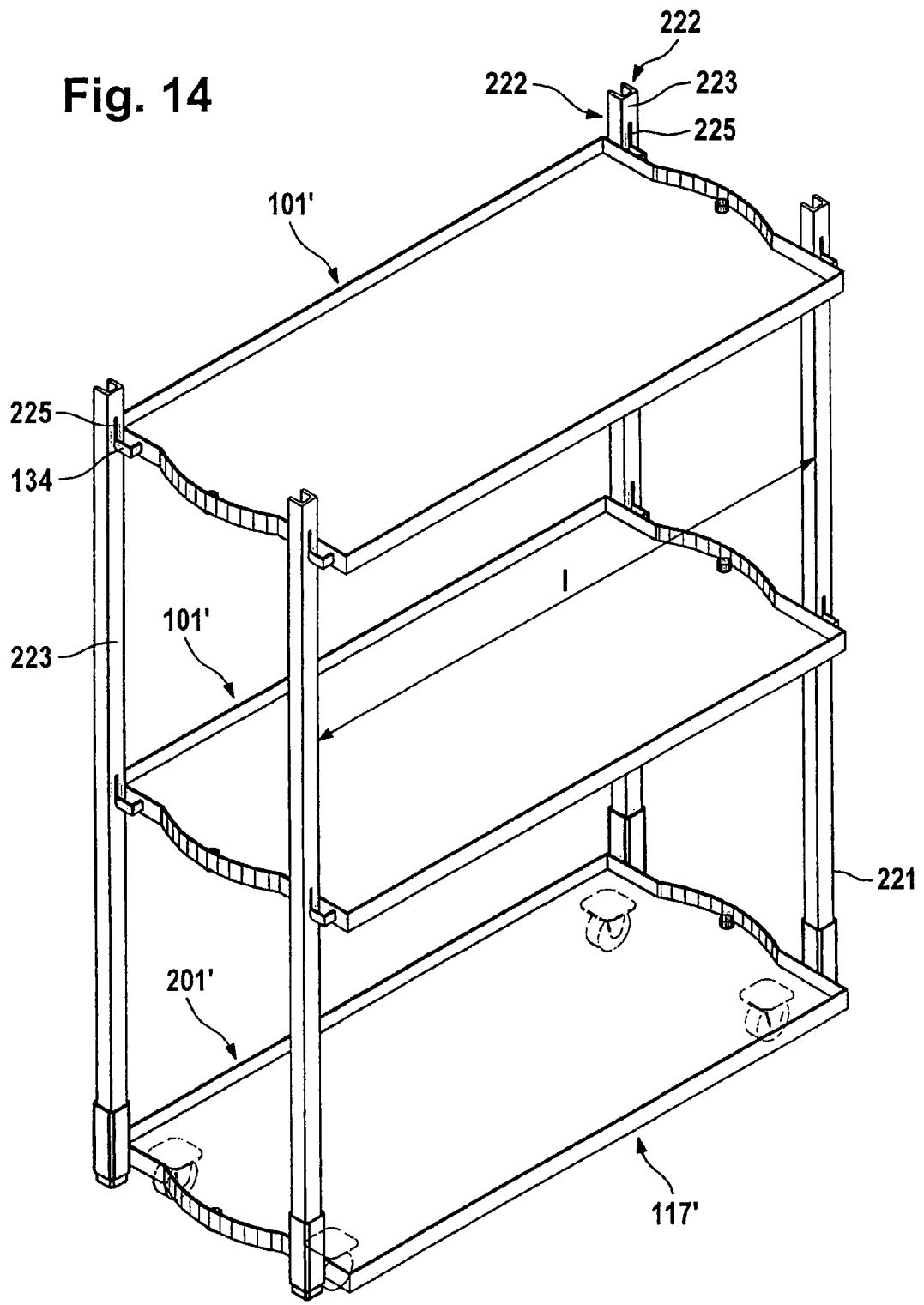
FIG. 14 shows a perspective view of a second embodiment of a watering device in accordance with the invention.
Figure 15:
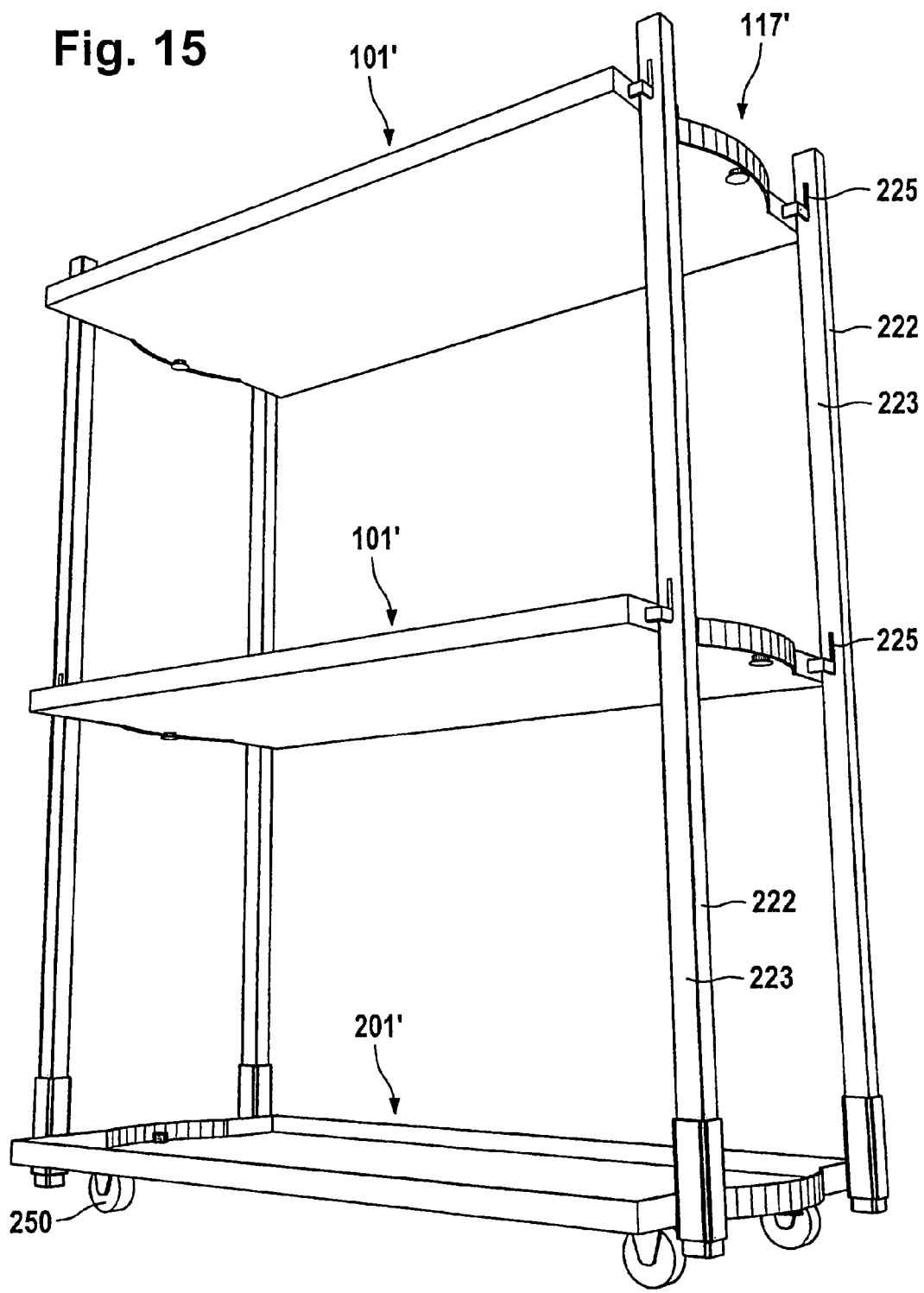
FIG. 15 shows the watering device according to FIG. 14 from a different angle.

FIG. 13 shows a second embodiment of a base platform 201', which forms a second embodiment of a watering device in accordance with the invention (FIGS. 14 and 15). The only difference between the base platforms 201' and 201 is that two of the four support means 260' (in this case rectangular tubes with a square cross-section) are not placed exactly in the corner regions, but are displaced inwards so that the frame struts to be received match the positions of the mounting means 130', which have been modified in accordance with FIG. 12, and thus match the storage platform 101'.

FIGS. 14 and 15 show, by way of explanation, a second embodiment 117' of the watering device according to the invention, which is formed by using a base platform 201' in accordance with the second embodiment and a number of storage platforms 101' in accordance with the second embodiment.

In contrast to the method of hanging in a storage platform known from the state of the art, which was described earlier on, the method of hanging in a storage platform 101, 101' is that all four insertion arms 134 are inserted simultaneously into corresponding support recesses 225, which are at the same height. In this context, it is apparent that no space is needed between the front end portions or narrow sides 106a of the storage platform and the frame struts for movement or manipulation in the longitudinal direction. Instead, a corresponding manipulation space is needed in the area between the protrusion 124 and the corners 120 in the transverse direction, but it is present there anyway.

In the watering device according to the first embodiment, in addition to the variant already described, in which the storage platforms are hung in the frame struts the opposite way round (top side facing downwards), there is also another way of storing the storage platforms, which saves more space, in which the storage platforms are preferably likewise placed the opposite way round (top side facing downwards), but are not hung in the support recesses, instead being inserted from the opposite side of the watering device, so that the insertion end portions of the storage platforms protrude not into the support recesses, but into regions of the frame struts which are free of material and—depending on the cross-sectional shape of the frame struts form a slot running in the longitudinal direction of the frame strut concerned (especially with a C or U shape, indicated by 140 in FIG. 16). This has the advantage that the storage platforms can be stacked close together, one above the other, directly on top of each other, without being dependent on the predetermined spaces between the support recesses. In this way, more storage platforms can be stacked on a base platform than when they are hung in normally, and, what is more, it saves time, because the storage platforms are not hung in, but only have to be placed one on top of the other.

Figure 18:
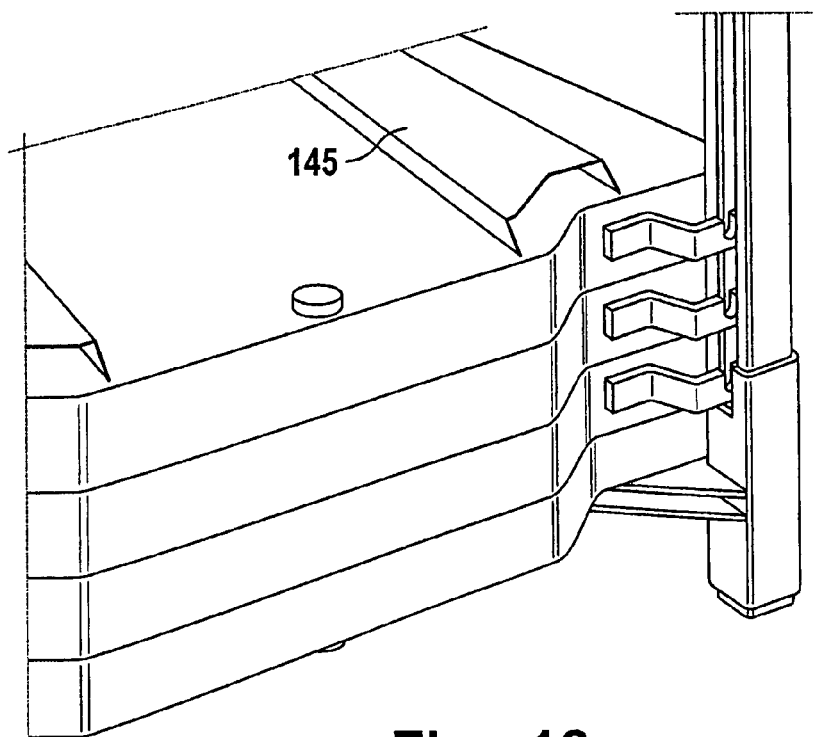
FIG. 18 shows storage platforms stacked the other way round.

FIG. 18 shows a way of stacking the storage platforms 40 in this way, bracing profiles 145 which are U-shaped in cross-section being attached to the underside of the floor 103 to increase the load-bearing capacity of the floor or storage platform, the facing edges at the ends serving at the same time as a means for centrally positioning a further storage platform placed on the stack from above.

Figure 19:
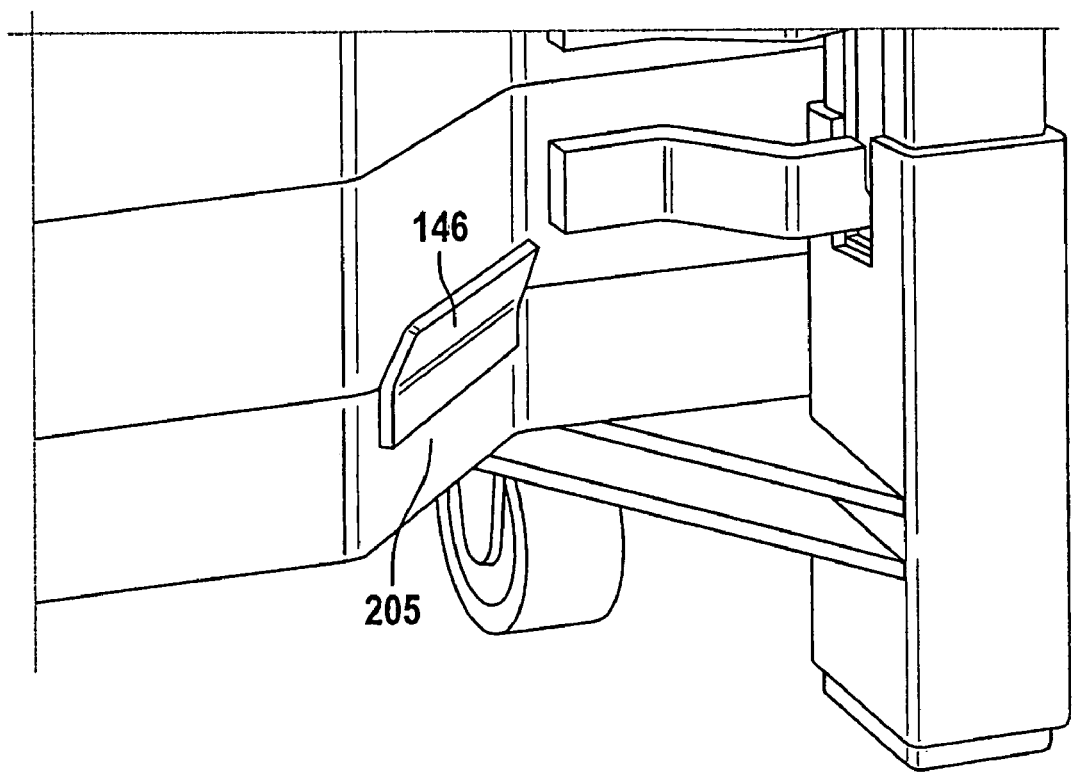
FIG. 19 shows a partial view of a bottom corner region of the storage platform.

In order to ensure that the bottom storage platform, i.e. the one resting directly on the base platform 201, is in a centred position, meaning a position in which the side wall 105 of the storage platform is resting substantially directly in line with the side wall 205 of the base platform 201, without there being any lateral displacement, centring members 146 can be attached to the side wall 205 of the base platform, as shown in FIG. 19. In the case illustrated, two plate-like centring members 146 (FIG. 19 shows only one of them) are welded to each of the protrusions 124, which in this case are trapezoid, a part of each centring member 146 projecting upwards over the side wall and thus forming a means for centrally positioning a storage platform placed on it. The upwardly projecting part of the centring member is bent slightly outwards in order to facilitate placing a storage platform on it.

Figure 17:
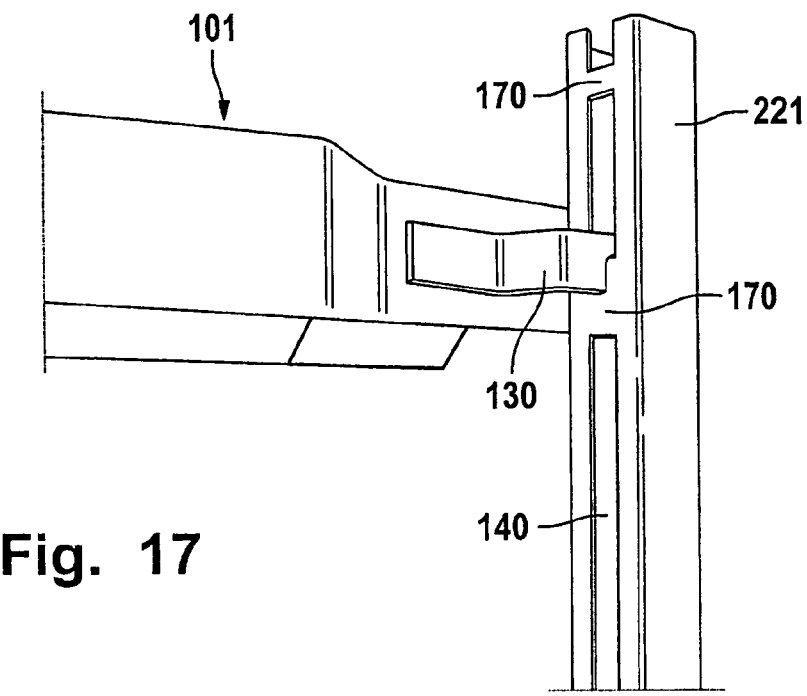
FIG. 17 shows a corner region of a storage platform hung in the other way round.

If the frame struts are also provided, in their end regions, with one or two spaced apart strut(s) 170, as is shown in FIG. 16, it is possible to hang in one or two topmost storage platforms the opposite way round, provided their insertion end portions each have two recesses 136, 136a (FIG. 3), thus providing the watering device with improved stability in the area of the upper ends of the frame struts and preventing the frame struts from moving apart in an unwanted manner. FIG. 17 shows a storage platform 101 hung in such struts 170 in the position when in use.

In order to ensure that whenever a number of storage platforms are stacked immediately one on top of the other, the insertion end portions of the bottom storage platform resting directly on the base platform do not have to bear the entire weight of the storage platforms, it is advantageous for cut-outs 262 to be integrated into the support means or rectangular tubes of the base platform, into which the insertion end portions of a bottom-most storage platform can project without bearing a load. The cut-outs 262 amount, as it were, to extensions of the slot portions of the frame struts and, measuring from the upper ends of the support means 260, have a length t, FIG. 8, which is dimensioned such that the insertion end portions of the bottom storage platform placed upside down on the base platform are not resting on the support means. The expression "placed upside down" refers here to an orientation rotated 180° about its central longitudinal axis relative to its normal position when in use to hold plants and water; "upside down" means that its upper side is facing downwards and the insertion end portions are facing in a direction opposite to the one when in use.

What is claimed is:

1. A storage platform for storing, watering and transporting plants comprising:
    a rectangular storage platform having first and second parallel long sides and two parallel narrow sides;
    two mounting means are positioned on a corner of each of the two parallel narrow sides and two insertion end portions are positioned on a corner of the second long side for hanging in frame struts;
    wherein each mounting means has an insertion end portion running along and parallel to the respective narrow side in which each insertion end ends freely in the direction of the first long side and wherein each mounting means is configured to be inserted into the frame struts in a direction parallel to the length direction of the respective narrow side;
    each of the narrow sides being provided with a protrusion between the mounting means, within each protrusion an overflow is disposed for defining a desired level of liquid within the storage platform, wherein the overflow is infinitely or gradually height-adjustable in order to set a desired level of liquid within the storage platform.

2. The storage platform as claimed in claim 1, wherein the mounting means are offset and have a supporting arm and an insertion arm forming the insertion end portion.

3. The storage platform as claimed in claim 2, wherein the supporting arms are fastened to a side wall.

4. The storage platform as claimed in claim 1, wherein the insertion end portions have at least one recess for hanging in frame struts in a positive fit.

5. The storage platform as claimed in claim 1, wherein the storage platform is pan-like in form.

6. The storage platform as claimed in claim 1, wherein the storage platform is provided with upwardly extending peripheral side walls for retaining the desired level of liquid within the storage platform.

7. The storage platform as claimed in claim 1, wherein the overflow has visual marks and/or mechanical retaining means in predetermined positions.

8. The storage platform as claimed in claim 1, wherein the overflow has at least one drainage opening pointing to the side.

9. The storage platform as claimed in claim 1, wherein the overflow is rotatably mounted in an opening.

* * * * *